United States Patent [19]
Grinwald et al.

[11] Patent Number: 5,464,178
[45] Date of Patent: Nov. 7, 1995

[54] NEON TUBE SUPPORT

[75] Inventors: Harold M. Grinwald, West Bend; Glen R. Blok, Milwaukee, both of Wis.

[73] Assignee: Everbrite, Inc., Greenfield, Wis.

[21] Appl. No.: 215,513

[22] Filed: Mar. 22, 1994

[51] Int. Cl.⁶ .................................................. F16L 3/00
[52] U.S. Cl. ............................ 248/50; 362/396; 267/179
[58] Field of Search ............................ 248/50, 316.7; 632/263, 396; 267/178, 179

[56] References Cited

U.S. PATENT DOCUMENTS

| | | | |
|---|---|---|---|
| 4,666,109 | 5/1987 | Fallon et al. | 248/50 |
| 5,108,054 | 4/1992 | Degand | 248/50 |
| 5,257,762 | 11/1993 | Trame et al. | 248/50 |

*Primary Examiner*—Blair M. Johnson
*Assistant Examiner*—Anita M. King
*Attorney, Agent, or Firm*—Ryan, Maki & Hohenfeldt

[57] ABSTRACT

A tubular plastic body of a neon tubing support has a bore terminating in a lower opening and in an opposite internally shouldered upper opening. A helical spring is installed in the bore through the lower opening and retained by a plug in the lower opening at one end of the bore and by the shoulder at the other end. A stem unit includes a shaft having a tubing engaging element on one end, and extends into the bore coaxially with the spring and terminates in an integral bulbous portion. The bulbous portion is axially slotted to define legs which can flex toward each other for clearing through the undersized top opening in the body. The bulbous portion has a shoulder and passes axially through the spring to compress some of the convolutions for developing a force causing the shoulder to engage with the convolutions intermediate of the ends of the spring to create a bidirectionally resilient neon tubing support.

7 Claims, 2 Drawing Sheets

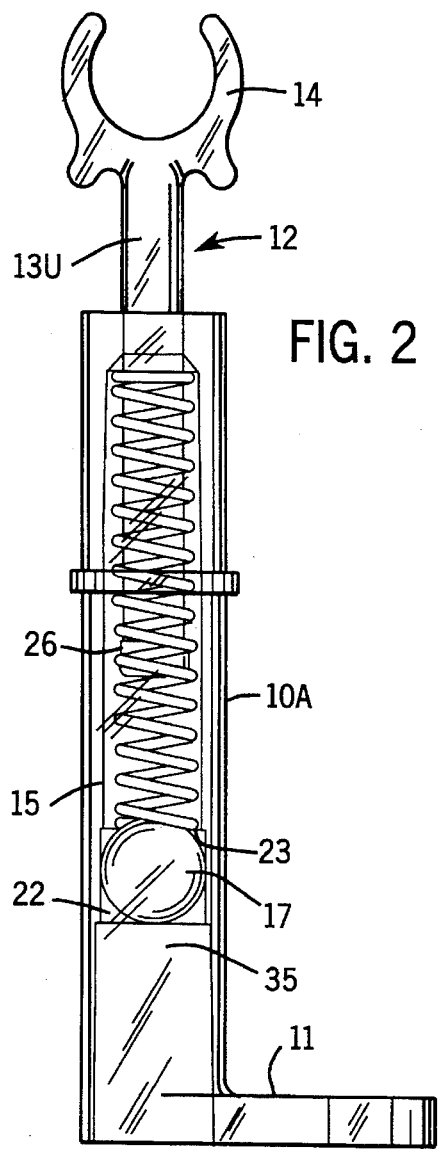
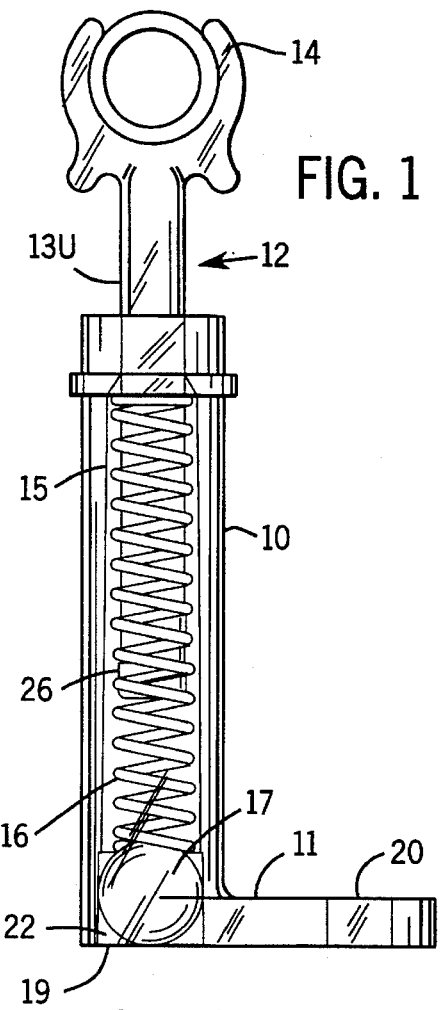
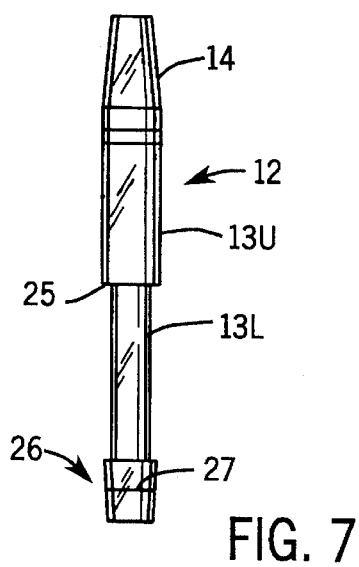
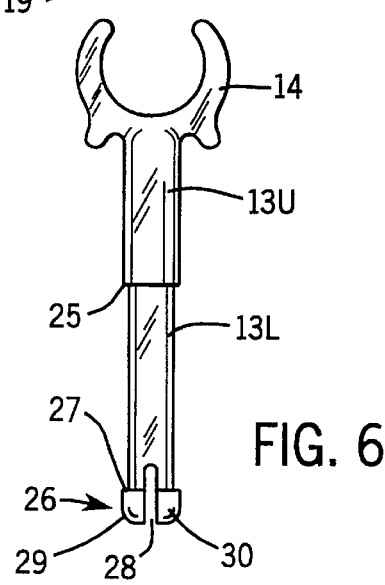

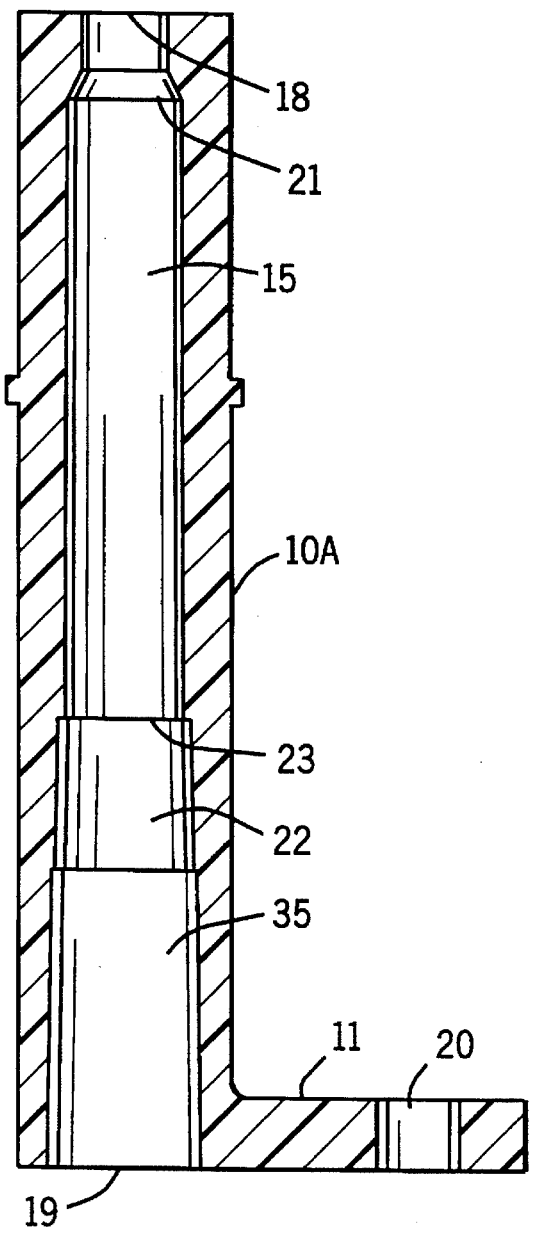
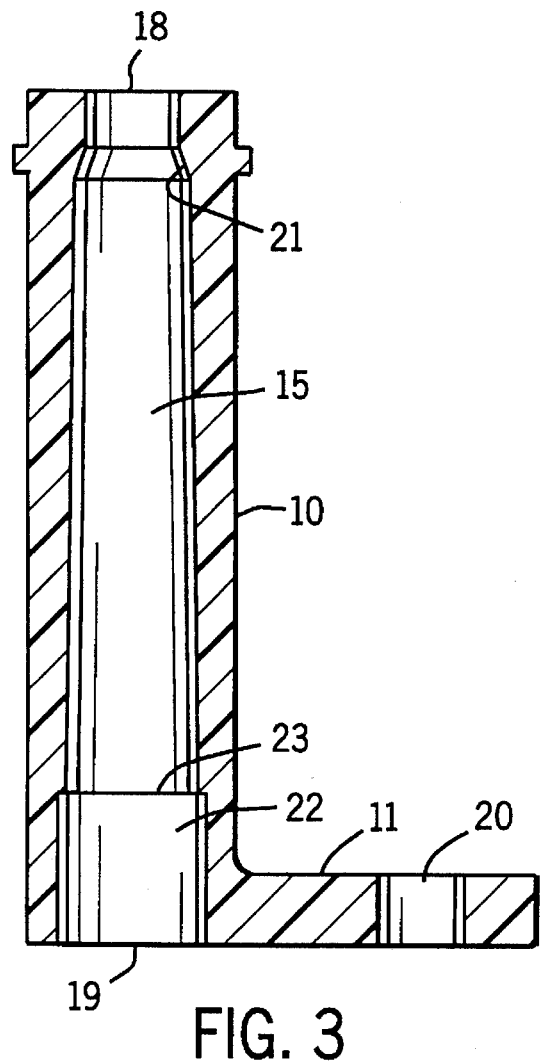
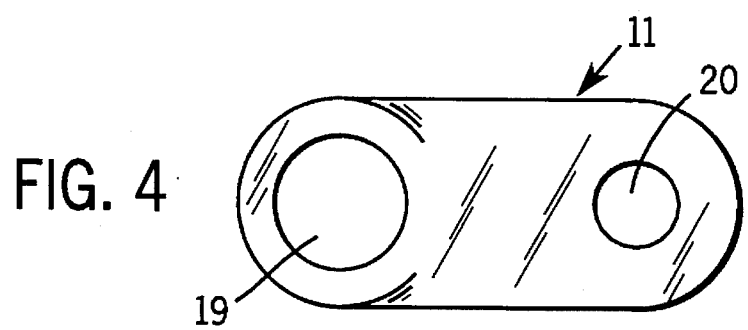

NEON TUBE SUPPORT

BACKGROUND OF THE INVENTION

The invention disclosed herein pertains to a support for supporting in resilient fashion luminescent gas filled tubing such as tubing used in neon signs. Neon is used herein as the generic term for mercury vapor and other light emitting inert gases such as argon and krypton.

Neon signs customarily comprise frames or panels on which the configured gas filled glass tubing is supported by means of standoffs or insulating supports. These supports are designed to hold the neon tubing in a fixed position and also to act as shock absorbers, which function to allow the neon filled glass tubing to flex a little, rather than fracture when the sign is subjected to a distorting or a vibrational force.

An ideal neon tube support is one that can be mass produced inexpensively, requires minimal assembly effort, is easy to use in practical application, is corrosion-resistant and produces no corona discharge in the presence of a high voltage electric field. Prior patents demonstrate the extensive effort that has been expended in trying to achieve these objectives.

Reducing production cost is especially important, since any substantial neon sign manufacturer may use millions of the supports in a year, so it is evident that a one-penny-per-unit cost reduction can amount to huge savings.

SUMMARY OF THE INVENTION

An objective achieved by the present invention is to provide a neon tube support that fulfills the objectives stated hereinbefore.

Briefly stated, the new tube support comprises a tubular body providing a first opening at the top end and a second opening at the bottom end. A helical spring having opposite open ends is disposed axially in the body and a plug retains the spring in the bore. The shaft of a stem element extends through the hole at the top of the body and into the spring in the body. A neon tube engaging element is formed on a portion of the shaft extending out of the body and a bulbous element is formed on an end portion of the shaft disposed within the convolutions of the spring in the body. The bulbous element has an axial slot dividing it into at least two legs that flex and unflex toward and away from each other to provide for the bulbous element flexing sufficiently to pass through the hole at the top of the body followed by passing through the spring and unflexing to engage the bulbous portion with the spring intermediate of the ends of the spring.

How the foregoing features of the new neon tube support are implemented will be evident in the ensuing more detailed description of a preferred embodiment of the invention which will now be set forth in reference to the drawings.

DESCRIPTION OF THE DRAWINGS

FIG. 1 is a side elevational view of one model of the new neon tubing support;

FIG. 2 is a side elevational view of another model of the new neon tubing support;

FIG. 3 is a vertical section taken through the support body depicted in FIG. 1;

FIG. 4 is a bottom view of the model of the tubing support depicted in FIG. 1;

FIG. 5 is a vertical section taken through the body of the new neon tubing support depicted in FIG. 2; and FIGS. 6 and 7 are, respectively, frontal and side elevational views of the stem used in the new neon tubing support.

DESCRIPTION OF A PREFERRED EMBODIMENT

The neon tube support depicted in FIG. 1 comprises a generally cylindrical tubular body 10 which is preferably composed of a durable plastic material such as polycarbonate resin. A base 11 extends radially and integrally from the cylindrical body 10 to provide for fastening the tube support to a panel over which a neon sign tubing configuration is disposed. A stem member, designated generally by the numeral 12 includes a shaft, an upper portion 13U of which is seen to extend out of the body of the support. The shaft portion 13U terminates externally of the tubular body in a neon tube engaging clip or saddle 14. A neon tube is shown in phantom lines. The tubular body 10 has an axial bore 15 that appears in solid lines in FIG. 1. The bore contains a helical spring 16 that is retained in the body cavity by a plug 17 which, in the preferred embodiment, is a non-conducting sphere.

Attention is now invited to FIG. 3 which is a vertical section of the cylindrical body 10 of the tube support. The body 10 is composed of a transparent plastic material so that the bore 15, the spring 16 and the spherical plug 17 are shown in solid lines, since they would be visible through clear plastic. Bodies are also made of a black opaque material for use where it is appropriate to use them.

The body 10 which is depicted in cross-section in FIG. 3 and body 10A in FIG. 5 each have an opening 18 at its nominally top end and an opening 19 at its nominally bottom end. The terms "top" and "bottom" are used herein as a convenient way of identifying the body parts, but it should be understood that the body 10 can be mounted vertically upright as it appears in FIGS. 1 and 3 so it is standing on its foot or base 11 or it may be angulated or inverted so it hangs from base 11. In either case, the body can be mounted with a screw or other fastener passing through hole 20 in base 11.

The bore 15 terminates near the top opening 18 of the body 10 in an angular axially beveled shoulder 21. The bottom opening 19 of the body constitutes the lower end of an axially inwardly directed cylindrical bore portion 22 that terminates at a reduced diameter location which thereby defines a small annular shoulder 23. In the taller body 10A shown in FIGS. 2 and 5, there is an additional long coaxial bore 35 which allows springs having equal lengths to be used in the tall body 10A and the shorter body 10. The axially adjacent longer bore 15 has a slightly larger diameter at its lower end in the vicinity of shoulder 23 than it has at the beginning of upper shoulder 21. In other words, the bore 15 diverges as it extends downwardly from the region below upper shoulder 21 to the region above lower shoulder 23.

As shown in FIG. 1, the assembled tube support contains a helical spring 16. The spring is in a relaxed or unloaded state as it appears in FIG. 1. Its length is such that when it is inserted into body 10 through bottom opening 19 which is shown in FIG. 3, its upper end abuts upper shoulder 21 and its lower end arrives at the level of lower shoulder 23. After spring 16 is inserted in bore 15, it is retained by a plug 17 which may be cylindrical or tapered or is preferably a sphere as shown. The spherical plug 17 is force fit into cylindrical bore portion 22 of the body in FIG. 3 and is prohibited from being forced too far into the body by the presence of lower shoulder 23 at the upper end of bore portion 22. Spherical plug 17 is composed of a non-metallic material since it has been found that use of a metal sphere, such as a ball bearing, may result in increased corona discharge. The spherical plug 17 is preferably composed of plastic, but a ceramic plug or sphere could also be used.

Attention is now invited to FIGS. 7 and 6 which show side and frontal elevational views of the stem element 12 mentioned previously in connection with FIG. 1. The stem element is preferably composed of a tough plastic such as polycarbonate resin. The FIG. 6 frontal view shows that shaft 13 of the stem element comprises a nominally upper cylindrical part 13U and a nominally lower cylindrical part 13L. The part 13L has a diameter that is smaller than the part 13U so as to create a shoulder 25 intermediate to the ends of the shaft. The lower end of shaft part 13L terminates in a knob or bulbous portion which is designated generally by the numeral 26. It is larger in one dimension than the shaft portion 13L so as to create a shoulder 27. An axially extending slot 28 divides the bulbous portion 26 into two parts called legs, 29 and 30, which can flex toward each other because of the slot and thereby reduce the diameter of the bulbous portion 26 when the legs are flexed.

Assuming now that helical spring 16 is installed in body 10 in FIG. 1 and/or body 10A in FIG. 2 and the spherical spring retainer plug 17 is in place, the next step in assembling the tube support is to insert and secure the stem 12 in the tubular body 10, particularly in the center of the spring. Referring to FIG. 3, one may see that the diameter of the top opening 18 in body 10 is slightly smaller than the overall diameter of the bulbous portion 26 of the stem element. The bulbous portion 26 is rounded to encourage its legs 29 and 30 to flex toward each other when the shaft is pushed through opening 18 so the shaft 13 of the stem passes into the body 10 down the open center of the helical spring 16. When about one-half of the length of the shaft 12 is inserted in tubular body 10, the shoulder 25 on the shaft abuts the uppermost convolutions or top of the helical spring 16 so as to effect compression of part of the spring. Advancement of the shaft is continued until several convolutions of the spring below the bulbous portion 26 are compressed onto each other while convolutions above the bulbous portion remain open. At this time, the shoulder 27 of the bulbous portion is able to enter between the junction of the compressed stack of convolutions and the uncompressed convolutions above the stack. Then, when the force applied to the stem member for inserting it is removed, the spring restores to its uncompressed state and the bulbous portion 26 is trapped between a pair of convolutions intermediate of the top and bottom ends of spring 16. In this condition, the shaft of the stem 12 cannot be backed out of the spring and cannot, of course, be withdrawn from body 10. The favorable result is that a neon tube in the U-shaped tube engaging clip 14 of the stem member 12 can be supported in bi-directional resilience since the stem being engaged with the spring through the agency of the bulbous element and the spring being compressible under further influence of the shaft shoulder 25 can load the spring in either axial direction.

Although a preferred embodiment of the invention has been described in detail, such description in intended to be illustrative rather than limiting, for the invention may be variously embodied and is to be limited only by interpretation of the claims which follow.

It is claimed:

1. A neon tube support including:

a tubular body having nominally top and bottom ends and an axial cylindrical bore through the body providing a first opening of predetermined diameter at the top end and a second opening at the bottom end, a helical spring having convolutions defining an axial opening and having opposite ends is disposed axially in the bore, a stem element comprised of a shaft extending through the opening at the top of the tubular body and into said axial opening of said spring in the bore of the body, a tube engaging element formed on a portion of the shaft extending out of the body and a bulbous element formed on the opposite end of the shaft disposed within said convolutions of said axial opening of the spring in the tubular body, said bulbous element having a size to provide for the element to pass through said opening at the top of the body and through part of the axial length of the spring for the bulbous element to engage with the spring approximately midway between said opposite ends of the spring, said bore having a first portion extending axially inwardly of the tubular body a predetermined distance from said second opening at said bottom end of the body and a plug installed in said first portion of the bore for retaining said spring in the tubular body.

2. A neon tube support according to claim 1 wherein at the place where said first portion of the bore terminates the inside diameter of the bore decreases such that a shoulder is developed in the bore for limiting inward travel of said plug.

3. A neon tube support according to claim 2 wherein said tubular body has a predetermined axial length and a second portion of said bore begins where said first portion of predetermined axial length terminates and said second portion extends axially of the bore to a second shoulder in the bore proximate to said first opening of the body, the second shoulder restraining the spring from exiting the body through said first opening.

4. A neon tube support according to claim 3 wherein the inside diameter of the bore decreases gradually in the axial direction from the first shoulder to the second shoulder and the diameter of the first opening is smaller than the diameter of the bore at said second shoulder.

5. A tube support according to claim 3 wherein the tubular body is axially longer than said predetermined axial length and said first portion of the bore for accommodating the plug is longer axially than said predetermined length such that the axial distance between the first and second shoulders in the bore remains the same and the axial length of the helical spring remains the same.

6. A neon tube support according to any one of claims 1, 2, 3, 4, or 5 wherein said plug is a sphere composed of non-conductive material.

7. The neon tube support according to claim 6 wherein said sphere is a plastic material.

* * * * *